United States Patent
Kim et al.

(10) Patent No.: US 12,246,300 B2
(45) Date of Patent: Mar. 11, 2025

(54) $CO_2$ AND $O_2$ REMOVER

(71) Applicant: CLARIANT CATALYSTS (JAPAN) K.K., Tokyo (JP)

(72) Inventors: Hyunjoong Kim, Toyama (JP); Kazuhiro Yamada, Toyama (JP)

(73) Assignee: CLARIANT CATALYSTS (JAPAN) K.K., Tokyo (JP)

( * ) Notice: Subject to any disclaimer, the term of this patent is extended or adjusted under 35 U.S.C. 154(b) by 338 days.

(21) Appl. No.: 17/790,971

(22) PCT Filed: Feb. 1, 2021

(86) PCT No.: PCT/JP2021/003485
§ 371 (c)(1),
(2) Date: Jul. 6, 2022

(87) PCT Pub. No.: WO2021/161832
PCT Pub. Date: Aug. 19, 2021

(65) Prior Publication Data
US 2023/0048324 A1  Feb. 16, 2023

(30) Foreign Application Priority Data
Feb. 10, 2020  (EP) .................................... 20156317

(51) Int. Cl.
*B01D 53/22* (2006.01)
*B01D 53/04* (2006.01)
(Continued)

(52) U.S. Cl.
CPC ............ *B01J 20/041* (2013.01); *B01D 53/04* (2013.01); *B01J 20/08* (2013.01); *B01J 20/103* (2013.01);
(Continued)

(58) Field of Classification Search
CPC .... B01J 20/103; B01J 20/28064; B01J 20/08; B01J 20/041; B01J 20/3078;
(Continued)

(56) References Cited

U.S. PATENT DOCUMENTS 2,500,516 A * 3/1950 Carpenter ............. C07C 1/0485
518/703
5,028,577 A * 7/1991 Michaels ............... B01J 23/626
502/328
(Continued)

FOREIGN PATENT DOCUMENTS

CA 2575482 C * 1/2011 ........... B01D 53/864
CN 1301666 B 7/2001
(Continued)

OTHER PUBLICATIONS

Gerzeliev I. M. et al., "Partial oxidation of lower alkanes by active lattice oxygen of metal oxide systems. 2. Synthesis of solid contacts and syngas production in a pilot plant with a riser reactor" Petroleum Chemistry 52(5), 305-312 (2012).
(Continued)

*Primary Examiner* — Anthony R Shumate

(57) ABSTRACT

The present invention relates to the $CO_2$ and $O_2$ remover. The $CO_2$ and $O_2$ remover comprises 65 to 85 weight percent (wt. %) of a nickel oxide (NiO), 5 to 20 wt. % of a magnesium oxide (MgO), wherein the weight ratio of the nickel oxide and the magnesium oxide (NiO/MgO) is 4 to 11, and wherein the wt. % is based on the weight of the $CO_2$ and $O_2$ remover.

11 Claims, 1 Drawing Sheet

(51) Int. Cl.
*B01J 20/04* (2006.01)
*B01J 20/08* (2006.01)
*B01J 20/10* (2006.01)
*B01J 20/14* (2006.01)
*B01J 20/28* (2006.01)
*B01J 20/30* (2006.01)

(52) U.S. Cl.
CPC ......... *B01J 20/14* (2013.01); *B01J 20/28059* (2013.01); *B01J 20/28061* (2013.01); *B01J 20/28064* (2013.01); *B01J 20/3007* (2013.01); *B01J 20/3078* (2013.01); *B01D 2253/104* (2013.01); *B01D 2253/106* (2013.01); *B01D 2253/1124* (2013.01); *B01D 2253/25* (2013.01); *B01D 2253/306* (2013.01); *B01D 2257/104* (2013.01); *B01D 2257/504* (2013.01)

(58) Field of Classification Search
CPC .............. B01J 20/3007; B01J 20/28059; B01J 20/28061; B01J 20/14; B01D 2253/1124; B01D 2253/25; B01D 2253/106; B01D 2253/306; B01D 2253/104; B01D 53/04; B01D 2257/104; B01D 2257/504
See application file for complete search history.

(56) References Cited

U.S. PATENT DOCUMENTS

| | | | | |
|---|---|---|---|---|
| 5,556,447 | A * | 9/1996 | Srinivasachar | C22B 7/02 588/256 |
| 6,808,621 | B1 * | 10/2004 | Cisneros | C01D 1/04 208/299 |
| 8,921,616 | B2 * | 12/2014 | Kizaki | C07C 29/143 568/861 |
| 9,539,541 | B2 | 1/2017 | Hamad | |
| 2004/0081614 | A1 * | 4/2004 | Ying | B01D 53/864 422/600 |
| 2006/0070587 | A1 * | 4/2006 | Bhalsora | F02D 19/0644 123/3 |
| 2012/0055334 | A1 * | 3/2012 | Ogata | B01D 53/323 95/131 |
| 2013/0078159 | A1 * | 3/2013 | Fan | B01J 20/041 422/149 |
| 2013/0079566 | A1 * | 3/2013 | Lin | B01J 23/34 585/242 |
| 2014/0000456 | A1 | 1/2014 | Succi | |
| 2015/0080620 | A1 * | 3/2015 | Boon | C10J 3/36 585/240 |
| 2015/0273439 | A1 * | 10/2015 | Sakamoto | B01J 37/04 585/644 |
| 2017/0136400 | A1 | 5/2017 | Sundaram | |
| 2017/0136402 | A1 * | 5/2017 | Sundaram | B01D 53/047 |
| 2017/0138236 | A1 * | 5/2017 | Sundaram | B01D 53/62 |
| 2018/0036672 | A1 * | 2/2018 | Sundaram | B01D 53/0473 |
| 2018/0036674 | A1 * | 2/2018 | Sundaram | C01B 32/50 |
| 2019/0170346 | A1 | 6/2019 | Kim | |
| 2023/0050105 | A1 * | 2/2023 | Ben-Zvi | E21B 41/0064 |

FOREIGN PATENT DOCUMENTS

| | | |
|---|---|---|
| CN | 105268441 A | 1/2016 |
| JP | 2005319345 A | 11/2005 |
| KR | 20120025679 | 3/2012 |
| KR | 20120025679 A | 3/2012 |
| KR | 20180033015 | 4/2018 |
| KR | 20180033015 A | 4/2018 |
| WO | 2007002792 A2 | 1/2007 |
| WO | 2018056766 | 3/2018 |
| WO | WO-2018056766 A1 * | 3/2018 ............ B01J 8/1872 |

OTHER PUBLICATIONS

Serra M. et al., "Study of preparation conditions of Ni0-Mg0 systems to control the morphology and paticle sieze of Ni0 phase," Solid State Ionics 134, N229-239, (2000).

Gac et al., "Acide-base properties f Ni—MgO—Al2O3 materials", Applied Surface Science, Elsevier, Amsterdam, vol. 257, No. 7, 2875-2880, Jan. 15, 2011.

* cited by examiner

$CO_2$ AND $O_2$ REMOVER

FIELD OF THE INVENTION

The present invention relates to a $CO_2$ and $O_2$ ($CO_2/O_2$) remover and a method of manufacturing thereof.

TECHNICAL BACKGROUND OF THE INVENTION

A $CO_2/O_2$ remover is required for example in a semiconductor manufacturing process where an inert gas atmosphere containing nitrogen, helium or argon is used. An active gas such as $CO_2/O_2$ needs to be removed to make the atmosphere inert.

WO2013109895 discloses a $CO_2$ sorbent, the $CO_2$ sorbent comprises (i) a magnesium salt, and (ii) at least one salt of a Group IA element wherein (i) said magnesium salt and (ii) said Group IA element salt are present in a molar ratio of from about 8:1 to 3:1.

BRIEF SUMMARY OF THE INVENTION

An objective is to provide a $CO_2/O_2$ remover sufficiently remove $CO_2$ and $O_2$ from a gas.

An aspect of the invention relates to a $CO_2$ and $O_2$ remover comprising: 65 to 85 weight percent (wt. %) of a nickel oxide (NiO), 5 to 20 wt. % of a magnesium oxide (MgO), wherein the weight ratio of the nickel oxide and the magnesium oxide (NiO/MgO) is 4 to 11, and wherein the wt. % is based on the weight of the $CO_2$ and $O_2$ remover.

Another aspect of the invention relates to a method of manufacturing a $CO_2$ and $O_2$ remover comprising steps of: mixing a nickel compound and a magnesium compound, and calcining the mixture to form the $CO_2$ and $O_2$ remover, wherein the $CO_2$ and $O_2$ remover comprises 65 to 85 weight percent (wt. %) of a nickel oxide (NiO), 5 to 20 wt. % of a magnesium oxide (MgO), wherein the weight ratio of the nickel oxide and the magnesium oxide (NiO/MgO) is 4 to 11, and wherein the wt. % is based on the weight of the $CO_2$ and $O_2$ remover.

Another aspect of the invention relates to a method of removing $CO_2$ and $O_2$ from air comprising steps of: placing a $CO_2$ and $O_2$ remover in a container, wherein the $CO_2$ and $O_2$ remover comprises 65 to 85 weight percent (wt. %) of a nickel oxide (NiO), 5 to 20 wt. % of a magnesium oxide (MgO), wherein the weight ratio of the nickel oxide and the magnesium oxide (NiO/MgO) is 4 to 11, and wherein the wt. % is based on the weight of the $CO_2$ and $O_2$ remover; and passing air through the container.

$CO_2$ and $O_2$ can be sufficiently removed from a gas by the present invention.

DETAILED DESCRIPTION OF THE INVENTION

Figure 1:
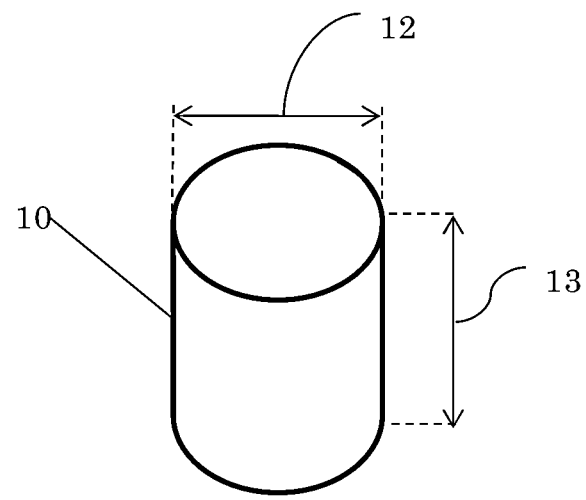
FIG. 1 shows an example of the cylindrical CO2/O2 remover 10 having a round cross section.

The $CO_2/O_2$ remover and the method of manufacturing thereof are explained below.

The $CO_2/O_2$ remover comprises 65 to 85 weight percent (wt. %) of a nickel oxide (NiO), 5 to 20 wt. % of a magnesium oxide (MgO) based on the weight of the $CO_2/O_2$ remover.

The NiO is 66.5 wt. % or more in an embodiment, 67.5 wt. % or more in another embodiment, 68.5 wt. % or more in another embodiment, 69 wt. % or more in another embodiment, 70.5 wt. % or more in another embodiment, 71.2 wt. % or more in another embodiment, based on the weight of the $CO_2/O_2$ remover. The NiO is 83.5 wt. % or less in an embodiment, 82.1 wt. % or less in another embodiment, 80.5 wt. % or less in another embodiment, 78.6 wt. % or less in another embodiment, 76 wt. % or less in another embodiment, 74.5 wt. % or less in another embodiment, based on the weight of the $CO_2/O_2$ remover.

The MgO is 5.5 wt. % or more in an embodiment, 6.2 wt. % or more in another embodiment, 7.5 wt. % or more in another embodiment, 7.9 wt. % or more in another embodiment, 8.9 wt. % or more in another embodiment, 9.9 wt. % or more in another embodiment, 10.5 wt. % or more in another embodiment, based on the weight of the $CO_2/O_2$ remover. The MgO is 19.2 wt. % or less in an embodiment, 18.1 wt. % or less in another embodiment, 17.5 wt. % or less in another embodiment, 16.3 wt. % or less in another embodiment, 15.5 wt. % or less in another embodiment, 14.8 wt. % or less in another embodiment, 13.2 wt. % or less in another embodiment, 12.5 wt. % or less in another embodiment, 11.1 wt. % or less in another embodiment, 9.9 wt. % or less in another embodiment, based on the weight of the $CO_2/O_2$ remover.

The weight ratio of NiO and MgO (NiO/MgO) is 4 to 11. The weight ratio of NiO and MgO (NiO/MgO) is 4.5 or more in an embodiment, 5.1 or more in another embodiment, 5.7 or more in another embodiment, 6.1 or more in another embodiment, 6.9 or more in another embodiment, 7.5 or more in another embodiment, 8.1 or more in another embodiment. The weight ratio of NiO and MgO (NiO/MgO) is 10.5 or less in another embodiment, 9.8 or less in another embodiment, 5.7 or less in another embodiment, 9 or less in another embodiment, 8.2 or less in another embodiment, 7.5 or less in another embodiment, 6.8 or less in another embodiment. The $CO_2/O_2$ remover comprising NiO and MgO within the range at the weight ratio above could sufficiently remove both $CO_2$ and $O_2$.

The $CO_2/O_2$ remover further comprises one or more of other metal oxide selected from the group consisting of a silicon oxide ($SiO_2$), an aluminum oxide ($Al_2O_3$), a sodium oxide ($Na_2O$) and a mixture thereof in an embodiment. The $CO_2/O_2$ remover further comprises one or more of other metal oxide selected from the group consisting of a silicon oxide ($SiO_2$), an aluminum oxide ($Al_2O_3$) and a mixture thereof in another embodiment.

The $CO_2/O_2$ remover comprises $SiO_2$ other than NiO and MgO in another embodiment. The $SiO_2$ is 1 wt. % or more in an embodiment, 2.2 wt. % or more in another embodiment, 2.9 wt. % or more in another embodiment, 3.6 wt. % or more in another embodiment, 4.5 wt. % or more in another embodiment, 5.2 wt. % or more in another embodiment, 6.9 wt. % or more in another embodiment, based on the weight of the $CO_2/O_2$ remover. $SiO_2$ is 20 wt. % or less in an embodiment, 17.2 wt. % or less in another embodiment, 13.5 wt. % or less in another embodiment, 10.3 wt. % or less in another embodiment, 8.5 wt. % or less in another embodiment, 6.4 wt. % or less in another embodiment, 5.2 wt. % or less in another embodiment, based on the weight of the $CO_2/O_2$ remover.

The $CO_2/O_2$ remover comprises $Al_2O_3$ other than NiO and MgO in an embodiment. The $Al_2O_3$ is 1 wt. % or more in an embodiment, 3.2 wt. % or more in another embodiment, 5.9 wt. % or more in another embodiment, 7.2 wt. % or more in another embodiment, 9.5 wt. % or more in another embodiment, 10.1 wt. % or more in another embodiment, 11.2 wt. % or more in another embodiment, based on the weight of the $CO_2/O_2$ remover. The $Al_2O_3$ is 30 wt. % or less in an embodiment, 26.3 wt. % or less in another embodiment, 22.5 wt. % or less in another embodiment, 18.3 wt. % or less in another embodiment, 15.5 wt. % or less in another embodiment, 12.8 wt. % or less in another embodiment, 11.6 wt. % or less in another embodiment, based on the weight of the $CO_2/O_2$ remover.

The $CO_2/O_2$ remover comprises an alkali metal oxide other than NiO and MgO in an embodiment. The alkali metal oxide is selected from the group consisting of a sodium oxide ($Na_2O$), a potassium oxide ($K_2O$), a lithium oxide ($Li_2O$) and a combination thereof in another embodiment. The alkali metal oxide comprises a sodium oxide ($Na_2O$) in another embodiment. The alkali metal oxide is 0.01 wt. % or more in an embodiment, 0.05 wt. % or more in another embodiment, 0.09 wt. % or more in another embodiment, 0.1 wt. % or more in another embodiment, 0.24 wt. % or more in another embodiment, 0.33 wt. % or more in another embodiment, 0.42 wt. % or more in another embodiment, based on the weight of the $CO_2/O_2$ remover. The alkali metal oxide is 2 wt. % or less in an embodiment, 1.9 wt. % or less in another embodiment, 1.2 wt. % or less in another embodiment, 0.8 wt. % or less in another embodiment, 0.6 wt. % or less in another embodiment, based on the weight of the $CO_2/O_2$ remover. The $CO_2/O_2$ remover could comprise no alkali metal oxide or $Na_2O$ in another embodiment.

The $CO_2/O_2$ remover composition described herein, including those listed in Table I, are not limiting; it is contemplated that one of ordinary skill in the art of chemistry could make minor substitutions or additional ingredients and not substantially change the desired properties of the $CO_2/O_2$ remover. For example, substitutions such as oxides of iron (Fe), calcium (Ca), titan (Ti), cerium (Ce), zinc (Zn), zirconium (Zr) in amount of 0.001 to 3.0 wt. % based on the weigh of the $CO_2/O_2$ remover may be used either individually or in combination to achieve similar performance. The $CO_2/O_2$ remover composition can be determined by a fluorescent X-ray analysis (XRF analysis) about the $CO_2/O_2$ remover.

The shape of the $CO_2/O_2$ remover is not limited. The $CO_2/O_2$ remover can be any shape as long as it generates sufficient removal capacity and strength as a $CO_2/O_2$ remover. The $CO_2/O_2$ remover is particle in an embodiment. The $CO_2/O_2$ remover is cylindrical or spherical in another embodiment. Cross section of the cylindrical $CO_2/O_2$ remover is selected from the group consisting of round, ellipse, polygon, rectangle and polylob in an embodiment. Cross section of the cylindrical $CO_2/O_2$ remover is round, ellipse or polylobe in another embodiment, polylobe in another embodiment, trilobe in another embodiment.

Figure 2:
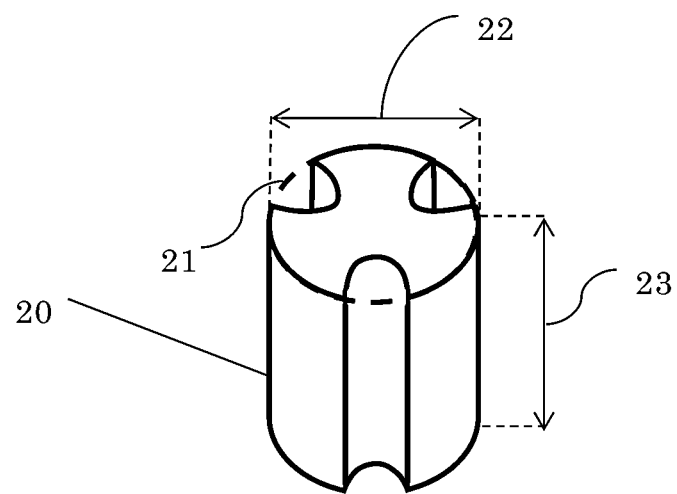
FIG. 2 shows an example of the cylindrical CO2/O2 remover 20 with a trilobed cross section.

An example of the cylindrical $CO_2/O_2$ remover 10 cross-sectionally round is shown in FIG. 1. Diameter 12 of the cylindrical $CO_2/O_2$ remover 10 is 0.5 to 10 mm in an embodiment, 0.8 to 8.7 mm in another embodiment, 1 to 5.7 mm in another embodiment, 1.2 to 3.3 mm in another embodiment. Length 13 of the cylindrical $CO_2/O_2$ remover 10 is 0.5 to 30 mm in an embodiment, 1.2 to 21 mm in another embodiment, 2.5 to 16 mm in another embodiment, 3.2 to 10 mm in another embodiment. The diameter of the ellipse and rectangle cross-section is the major axis. Diameter of the cross-section of polylobe, polygon is diameter of the circumcircle. An example of the cylindrical $CO_2/O_2$ remover 20 cross-sectionally trilobe is shown in FIG. 2. The circumcircle 21 of the trilobe cross-section is taken for the diameter of the cylindrical $CO_2/O_2$ remover 20. Diameter 22 of the trilobe $CO_2/O_2$ remover 20 is 0.5 to 10 mm in an embodiment, 0.8 to 8.7 mm in another embodiment, 1 to 5.7 mm in another embodiment, 1.2 to 3.3 mm in another embodiment. Length 23 of the trilobe cylindrical $CO_2/O_2$ remover 20 is 0.5 to 30 mm in an embodiment, 1.2 to 21 mm in another embodiment, 2.5 to 16 mm in another embodiment, 3.2 to 10 mm in another embodiment.

The $CO_2/O_2$ remover is porous in an embodiment. The pore volume is 0.05 $mm^3/g$ to 5.0 $mm^3/g$ in an embodiment. The pore volume can be measured with an automatic pore size distribution measure instrument for example BEL-SORP-mini-II from MicrotracBEL Corporation. Surface area ($S_{BET}$) of the $CO_2/O_2$ remover is 10 to 1000 $m^2/g$ in an embodiment, 32 to 800 $m^2/g$ in another embodiment, 58 to 645 $m^2/g$ in another embodiment, 68 to 500 $m^2/g$ in another embodiment, 80 to 320 $m^2/g$ in another embodiment, 85 to 240 $m^2/g$ in another embodiment, 100 to 200 $m^2/g$ in another embodiment. The surface area could be measured by a BET method (a single-point method) with a $N_2$ gas absorption at a liquid nitrogen temperature. A surface area analyzer such as Macsorb® Model-1210 from MOUNTECH Co., Ltd. could be used.

The $CO_2/O_2$ remover is made by a precipitation method or a dry method in an embodiment. A Ni compound, a Mg compound and optionally a Si compound, an Al compound and/or a Na compound are prepared. The compounds are mixed and calcined to form the $CO_2/O_2$ remover. The Al compound can be added to the mixture of the Ni compound and the Mg compound before the step of calcining or after the step of calcining in an embodiment.

For the raw materials of the $CO_2/O_2$ remover such as the compound of Ni, Mg, Al, Si and Na, any compound which provides the metal oxide thereof after calcination can be used.

The Ni compound could be an oxide, a salt or a mixture thereof. The Ni compound could be selected from the group consisting of a nickel oxide, a nickel nitrate, a nickel nitrite, a nickel hydrosulfate and a combination thereof in an embodiment.

The Mg compound could be an oxide, a salt or a mixture thereof. The Mg compound could be selected from the group consisting of an oxide, a magnesium nitrate, a magnesium nitrite, a magnesium hydrosulfate and a combination thereof in an embodiment.

The Si compound could be selected from the group consisting of a silica, a diatom earth, a liquid glass and a combination thereof in an embodiment.

The Al compound could be selected from the group consisting of a boehmite, an alumina sol and a combination thereof in an embodiment.

The Al compound could also function as a binder for the Ni compound and the Mg compound. As the Al compound could function as a binder of the precipitate, the Al compound could be separately mixed with the precipitate in another embodiment.

The Na compound could be a sodium carbonate in an embodiment.

The metal compounds could be mixed through a precipitation method where a solution dissolving the Ni compound and the Mg compound is prepared in an embodiment. The Ni compound and the Mg compound can be soluble salts, such as nitrates, nitrites and hydrosulfate in another embodiment.

The Ni compound is nickel nitrate in another embodiment. The Mg compound is magnesium nitrate in another embodiment. The Si compound and/or the Al compound could be added to dissolve in the solution in another embodiment. The Si compound could be dissolved in the solution in another embodiment. The solvent is a water in an embodiment. The solution is heated at 40° C. or higher for 1 hour or more in an embodiment to generate a precipitate. The precipitate was taken out by filtering in an embodiment. The precipitate is powder or particle in an embodiment. The precipitate is optionally mixed with the Si component and/or the Al component in another embodiment.

The metal compound mixture is calcined. The calcination is carried out after the step of shaping the metal compound mixture in another embodiment. The calcination temperature could be 100 to 900° C. in an embodiment, 120 to 680° C. in another embodiment, 180 to 500° C. in another embodiment, 200 to 400° C. in another embodiment. The calcination time is 30 minutes or more in an embodiment, 1 hour or more in another embodiment. The calcination time is 5 hours or less in an embodiment, 3 hours or less in another embodiment.

The mixture of the metal compounds can be shaped in a desired form in an embodiment. The shaping method is not limited but in an embodiment the mixture of the metal compounds is shaped by extruding or molding.

The shaped metal compound mixture could be calcined in an embodiment. The precipitate optionally mixed with the Si component and/or the Al component is calcined in an embodiment.

The $CO_2/O_2$ remover is reduced by exposing to a hydrogen gas in an embodiment. The hydrogen gas is a gas flow of 300 to 550° C. for 5 to 30 hours in an embodiment. After the reduction, an oxide layer is formed at the surface of the $CO_2/O_2$ remover for stabilization by for example exposing to a gas containing $O_2$ in an embodiment.

In the precipitation method, the solution can be separately prepared as an acid solution and an alkali solution in an embodiment. The acid solution is prepared by dissolving the Ni compound and the Mg compound in a solution in an embodiment. An alkali solution is prepared by dissolving the additional metal compound such as a Na compound in a solution in an embodiment. The Si compound could be dissolved in the acid solution in an embodiment. The acid solution is incrementally feed to the alkali solution until the mixed solution indicated about pH 7 in an embodiment. The precipitate from the mixed solution is taken out and get calcined.

In another embodiment, a method of manufacturing a $CO_2$ and $O_2$ remover comprises steps of: mixing a nickel compound and a magnesium compound, shaping the mixture of the nickel compound and the magnesium compound, and calcining the shaped mixture.

In another embodiment, a method of manufacturing a $CO_2$ and $O_2$ remover comprises steps of: mixing a nickel compound and a magnesium compound, calcining the mixture of the nickel compound and the magnesium compound, and shaping the calcined mixture.

The $CO_2/O_2$ remover can be also prepared by a dry method in another embodiment. The Ni compound and the Mg compound are mixed and calcined in another embodiment.

The $CO_2/O_2$ remover is used any places where $CO_2$ and $O_2$ are undesired in an atmosphere. For example, the $CO_2/O_2$ remover is applied to a gas purification system at a semiconductor manufacturing site.

EXAMPLE

Example 1

The $CO_2/O_2$ remover was prepared by the following method. An acid solution was prepared by dissolving 7.5 kg of nickel nitrate, 1.6 kg of magnesium nitrate and 0.3 kg of diatom earth in 14.7 kg of ion-exchanged water. Separately, an alkali solution was prepared by dissolving 3.9 kg of sodium carbonate in 17.4 kg of pure water. The acid solution was feed to the alkali solution until the mixed solution indicated neutrality. The generated precipitate was taken out by filtering and washing. The precipitate was dried and calcinated at 350° C. for two hour. The precipitate powder and boehmite were mixed at a weight ratio (precipitate powder:boehmite) of 9:1. The precursor $CO_2/O_2$ remover was formed by extruding the powder mixture with a vertical extruder. The extruded precursor of the $CO_2/O_2$ remover was cross-sectionally trilobe shape 20 with 1.6 mm of diameter 21 and about 7 mm of length 22 (FIG. 2).

The $CO_2/O_2$ remover of 300 cm$^3$ was filled in a quartz tube (40 mm inner diameter and 950 mm long) having an inlet and an outlet. The $CO_2/O_2$ remover reduced by exposing to a pure hydrogen gas. Then the hydrogen gas switched to a nitrogen gas after cooling down to room temperature. After purging the hydrogen gas, a nitrogen gas containing oxygen was flown in the tube to stabilize the $CO_2/O_2$ remover by making the oxide layer at the surface.

The surface area ($SA_{BET}$) was about 150 m$^2$/g measured by Macsorb® Model-1210 from MOUNTECH Co., Ltd.

The composition of the formed $CO_2/O_2$ remover was analyzed by a X-ray fluorescence spectrometer (XRF, Supermini-200, RIGAKU Corporation).

Example 2

The $CO_2/O_2$ remover was formed in the same manner of Example 1 except that magnesium nitrate hexahydrate was 2.43 kg, and silica was 0.14 kg.

The surface area ($SA_{BET}$) was about 150 m$^2$/g.

Comparative Example 1

The $CO_2/O_2$ remover was formed in the same manner of Example 1 except for the composition. The compositions of the $CO_2/O_2$ remover are shown in Table 1. The surface area ($SA_{BET}$) was about 150 m$^2$/g.

Measurement $CO_2$ Removal Amount

A quartz tube (inner diameter 20 mm, height 500 mm) was charged with 40 cm$^3$ of the $CO_2/O_2$ remover obtained above. The tube had an inlet at the top and an outlet at the bottom. A reduction was conducted to remove the oxide layer. After the reduction, a 30 ppm $CO_2$ gas ($CO_2/N_2$) flowed from the inlet to the outlet through the $CO_2/O_2$ remover at SV of about 3,500 h$^{-1}$. The $CO_2$ gas flow stopped when the $CO_2$ concentration at the outlet increased from zero to 0.5 ppm.

The $CO_2$ concentration of the outlet gas was measured with a gas chromatograph analyzer with a flame-ionization-detector (FID) and a methanizer (GC-8A/MTN-1, SHIMADZU CORPORATION).

$O_2$ Removal Amount

A 200 ppm $O_2$ gas (air/$N_2$) flowed from the inlet to the outlet through the $CO_2/O_2$ remover at SV of about 3,500 $h^{-1}$. The $O_2$ gas flow stopped when the $O_2$ concentration at the outlet increased from zero to 7.0 ppm. The $O_2$ concentration of the outlet gas was measured with a trace oxygen analyzer (Model 1000-RS, Advanced Micro Instruments, Inc.).

The "$CO_2$ absorption" and "$O_2$ absorption" were calculated by the equations below.

$CO_2$ removal ($m^3$/kg)=$CO_2$ gas flow rate ($m^3$/h)× $CO_2$ gas flow time (h)×$CO_2$ concentration 30 ppm/the remover weight (kg)

$O_2$ removal ($m^3$/kg)=$O_2$ gas flow rate ($m^3$/h)×$O_2$ gas flow time (h)×$O_2$ concentration 200 ppm/the remover weight (kg)

Results are shown in Table 1 below. The $CO_2$ removal was sufficiently over $1.6 \times 10^{-3}$ $m^3$/kg and the $O_2$ removal was sufficiently over $20 \times 10^{-3}$ $m^3$/kg in Example (Ex.) 1 and 2. The $O_2$ removal was insufficiently $14 \times 10^{-3}$ $m^3$/kg in Comparative Example (Com. Ex.) 1.

TABLE 1

| | Composition (wt. %) | | | | | NiO/MgO | $CO_2$ removal ×$10^{-3}$ $m^3$/kg | $O_2$ removal ×$10^{-3}$ $m^3$/kg |
|---|---|---|---|---|---|---|---|---|
| | NiO | MgO | $SiO_2$ | $Al_2O_3$ | $Na_2O$ | | | |
| Ex. 1 | 72.8 | 8.2 | 7.6 | 10.8 | 0.5 | 8.8 | 1.6 | 26.6 |
| Ex. 2 | 72.3 | 11.4 | 4.2 | 12.0 | 0.0 | 6.3 | 3.6 | 20.2 |
| Com. Ex. 1 | 63.4 | 15.8 | 8.0 | 12.4 | 0.3 | 4.0 | 4.8 | 14.0 |

The invention claimed is:

1. A method of removing $CO_2$ and $O_2$ from a gas, the method comprising:
   providing a $CO_2$ and $O_2$ remover in a container,
   wherein the $CO_2$ and $O_2$ remover comprises 65 to 85 weight percent (wt. %) of a nickel oxide (NiO), 5 to 20 wt. % of a magnesium oxide (MgO), each based on the weight of the $CO_2$ and $O_2$ remover; and
   wherein the weight ratio of the nickel oxide and the magnesium oxide (NiO/MgO) is 4 to 11, and
   passing the gas through the container,
   wherein the method further comprises, before passing the gas through the container, reducing the $CO_2$ and $O_2$ remover by exposure to hydrogen gas.

2. The method of claim 1, wherein the $CO_2$ and $O_2$ remover further comprises one or more of other metal oxide selected from the group consisting of an aluminum oxide ($Al_2O_3$), a silicon oxide ($SiO_2$), an alkali metal oxide and a mixture thereof.

3. The method of claim 1, wherein the $CO_2$ and $O_2$ remover further comprises 1 to 30 wt. % of an aluminum oxide ($Al_2O_3$) based on the weight of the $CO_2$ and $O_2$ remover.

4. The method of claim 1, wherein the $CO_2$ and $O_2$ remover further comprises 1 to 20 wt. % of a silicon oxide ($SiO_2$) based on the weight of the $CO_2$ and $O_2$ remover.

5. The method of claim 1, wherein the $CO_2$ and $O_2$ remover further comprises 0 to 2 wt. % of an alkali metal oxide based on the weight of the $CO_2$ and $O_2$ remover.

6. The method of claim 1, wherein the $CO_2$ and $O_2$ remover comprises no alkali metal oxide.

7. The method of claim 1, wherein a specific surface area ($S_{BET}$) of the $CO_2$ and $O_2$ remover is 10 to 1000 $m^2$/g.

8. The method of claim 1, wherein the gas is an inert gas.

9. The method of claim 1, wherein the gas is nitrogen, helium or argon.

10. The method of claim 1, wherein the exposure to hydrogen gas is performed at 300-550° C.

11. The method of claim 10, wherein the exposure to hydrogen gas is performed for a time in the range of 5-30 hours.

* * * * *